United States Patent
Chiu

(10) Patent No.: US 7,081,685 B2
(45) Date of Patent: Jul. 25, 2006

(54) SHOE GENERATOR HAVING A ROTOR WITH FORWARD/REVERSE MOVEMENT

(75) Inventor: Chun-Chen Chiu, Taichung Hsien (TW)

(73) Assignees: Meng-Hua Fu, Nantou Hsien (TW); Meng-Yu Liu, Taichung Hsien (TW)

( * ) Notice: Subject to any disclaimer, the term of this patent is extended or adjusted under 35 U.S.C. 154(b) by 256 days.

(21) Appl. No.: 10/694,898

(22) Filed: Oct. 29, 2003

(65) Prior Publication Data

US 2005/0093301 A1 May 5, 2005

(51) Int. Cl.
*H02P 9/04* (2006.01)
*H02K 7/10* (2006.01)
*H02K 1/22* (2006.01)

(52) U.S. Cl. .................. 290/1 R; 310/75 B; 310/75 A; 310/261

(58) Field of Classification Search ................ 290/1 A, 290/1 R, 1 E; 310/49 R, 15, 75 D, 75 B, 310/75 C, 75 A, 257, 254, 261, 90; 36/2.6; 219/211
See application file for complete search history.

(56) References Cited

U.S. PATENT DOCUMENTS

| 1,354,698 | A | * | 10/1920 | Shallcross ............... 73/862.331 |
| 2,929,477 | A | * | 3/1960 | Rodriguez et al. ........ 192/56.41 |
| 3,663,847 | A | * | 5/1972 | Schaefer ...................... 310/90 |
| 3,671,841 | A | * | 6/1972 | Hoffmann ................... 318/696 |
| 3,686,514 | A | * | 8/1972 | Dube et al. ................. 310/232 |
| 3,824,420 | A | * | 7/1974 | Stegeman et al. ............ 310/80 |
| 3,855,488 | A | * | 12/1974 | Britton et al. .............. 310/339 |
| 3,937,992 | A | * | 2/1976 | Shobert, II .................... 310/15 |
| 3,999,090 | A | * | 12/1976 | Sinnott ..................... 310/49 R |
| 4,395,924 | A | * | 8/1983 | Callahan .................. 74/424.74 |
| 4,501,981 | A | * | 2/1985 | Hansen ..................... 310/49 R |
| 4,528,468 | A | * | 7/1985 | Leubecker .................... 310/21 |
| 4,569,239 | A | * | 2/1986 | Shirley et al. ............. 74/89.34 |
| 4,639,627 | A | * | 1/1987 | Takekoshi et al. ...... 310/156.22 |
| 4,674,199 | A | * | 6/1987 | Lakic ............................ 36/2.6 |
| 4,764,697 | A | * | 8/1988 | Christiaens ............... 310/49 R |
| 4,806,809 | A | * | 2/1989 | Kubota et al. ............ 310/75 D |
| 4,893,038 | A | * | 1/1990 | Miyzawa ...................... 310/83 |
| 5,057,728 | A | * | 10/1991 | Dammeyer et al. ........... 310/77 |
| 5,717,265 | A | * | 2/1998 | Tukamoto et al. ............ 310/83 |
| 6,084,326 | A | * | 7/2000 | Nagai et al. ................... 310/80 |
| 6,100,612 | A | * | 8/2000 | Satoh ....................... 310/49 R |
| 6,169,644 | B1 | * | 1/2001 | Ito et al. ................... 360/267.3 |
| 6,222,287 | B1 | * | 4/2001 | Suzuki ..................... 310/49 R |
| 6,504,276 | B2 | * | 1/2003 | Yamamura ................ 310/75 D |
| 6,744,145 | B2 | * | 6/2004 | Chang ........................ 290/1 R |

* cited by examiner

*Primary Examiner*—Darren Schuberg
*Assistant Examiner*—Julio Cesar Gonzalez
(74) *Attorney, Agent, or Firm*—Troxell Law Office, PLLC

(57) ABSTRACT

A generator generates electricity when the generator is pressed and has a stator, a rotor, a drive shaft, a biasing member and a top cover. The rotor is mounted in the stator and has a central hole with at least one key. The drive shaft is slidably mounted in the central hole in the rotor base and has at least one spiral groove in which the at least one key on the rotor is mounted. The biasing member is mounted between the base and the drive shaft to provide a restitution force to the drive shaft when the drive shaft is pressed down manually. The top cover has a central bore through which the top of the drive shaft non-rotatably extends. Accordingly, movement of the drive shaft causes the rotor to rotate relative to the stator and generate electricity.

3 Claims, 5 Drawing Sheets

SHOE GENERATOR HAVING A ROTOR WITH FORWARD/REVERSE MOVEMENT

BACKGROUND OF THE INVENTION

1. Field of the Invention

The present invention relates to a generator, and more particularly to a generator that will generate electricity when the generator is pressed.

2. Description of Related Art

To improve attractiveness of an object, such as a shoe, an illumination or an audio device is mounted on or in the object, and an illuminated or audible warning is also provided in a dark environment. A conventional way to provide electricity to the illumination or audio device is to mount batteries in the object. The battery has a limited useful life, so the battery must be replaced with a new one when the battery dies. However, batteries mounted inside a solid object are difficult or impossible to replace.

To overcome the shortcomings, the present invention provides a generator to mitigate or obviate the aforementioned problems.

SUMMARY OF THE INVENTION

The main objective of the invention is to provide a generator that can generate electricity when the generator is pressed. The generator has a base, a stator, a rotor base, a rotor, a drive shaft, a biasing member and a top cover. The stator is annular and is mounted on the base. The rotor base is rotatably mounted on the base and is mounted inside the stator. The rotor base has a central hole with an inner surface defined through the rotor base and at least one key formed on the inner surface of the central hole. The rotor is mounted around the rotor base and has a gap defined between the rotor and the stator. The drive shaft is slidably mounted in the central hole in the rotor base and has at least one spiral groove in which the at least one key on the rotor base is mounted. The biasing member is mounted between the base and the drive shaft to provide a restitution force to the drive shaft. The top cover is mounted on the base to cover the stator, rotor base, the rotor, the drive shaft and the biasing member. The top cover has a central bore through which the top of the drive shaft non-rotatably extends.

Other objects, advantages and novel features of the invention will become more apparent from the following detailed description when taken in conjunction with the accompanying drawings.

DETAILED DESCRIPTION OF PREFERRED EMBODIMENT

Figure 1:
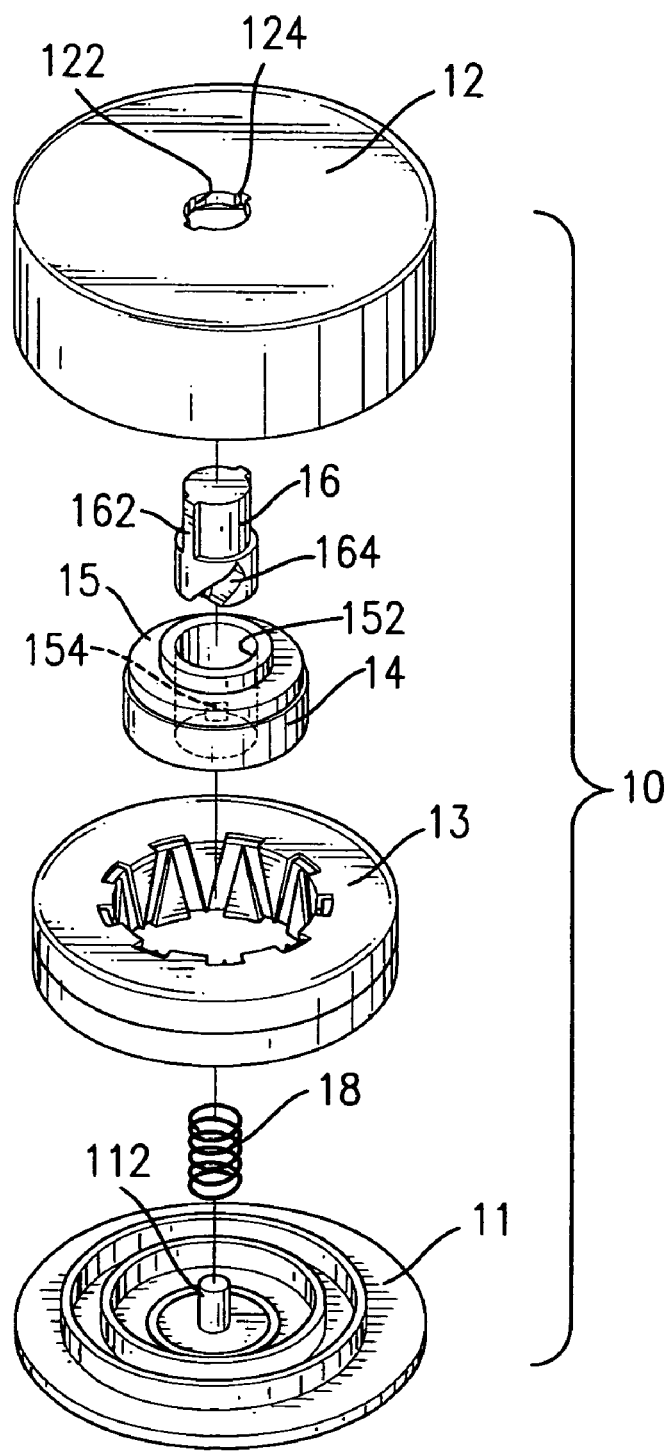
FIG. 1 is an exploded perspective view of a generator in accordance with the present invention.
Figure 2:
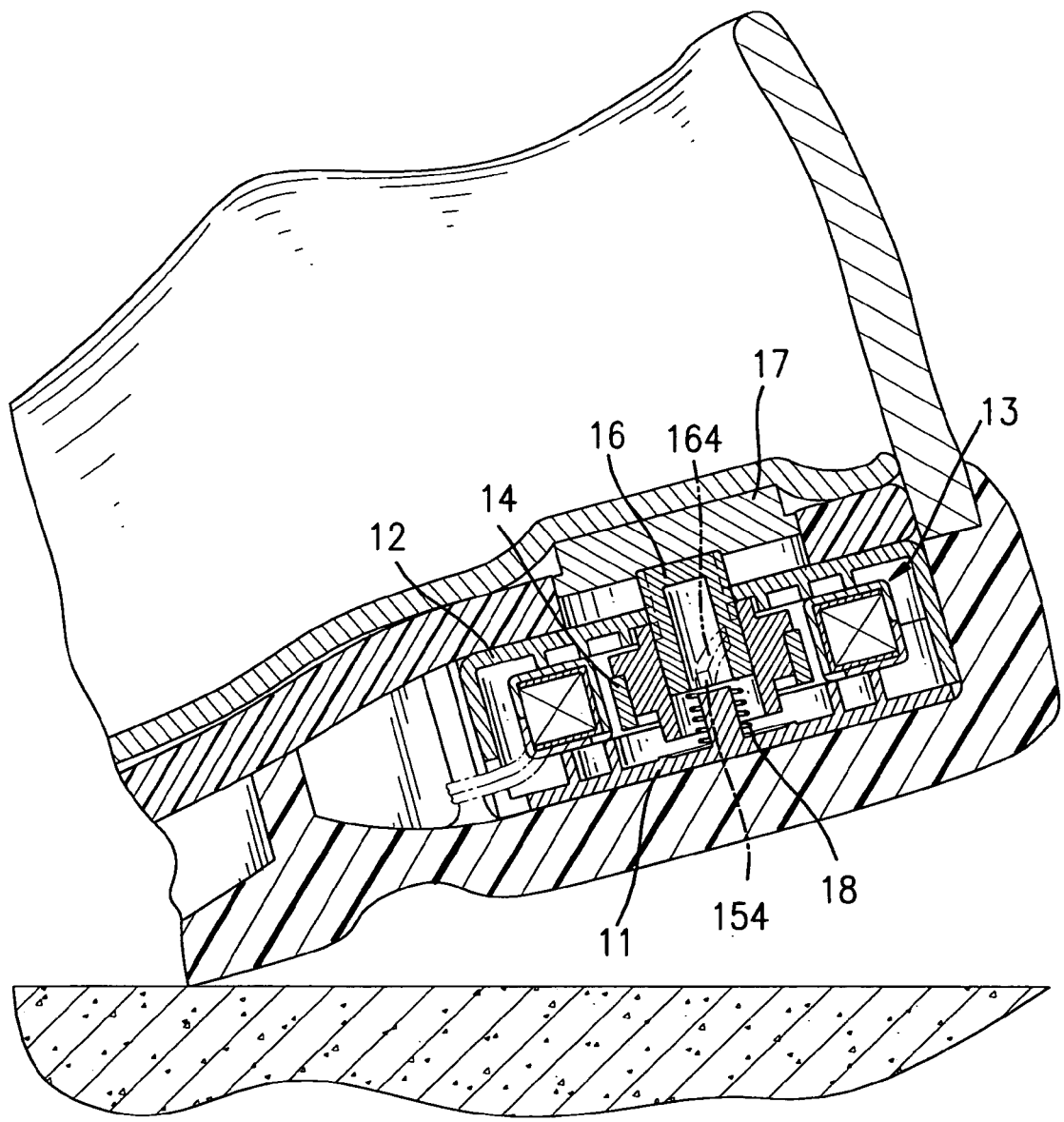
FIG. 2 is a cross sectional side plan view of a heel of a shoe with the generator in FIG. 1.
Figure 4:
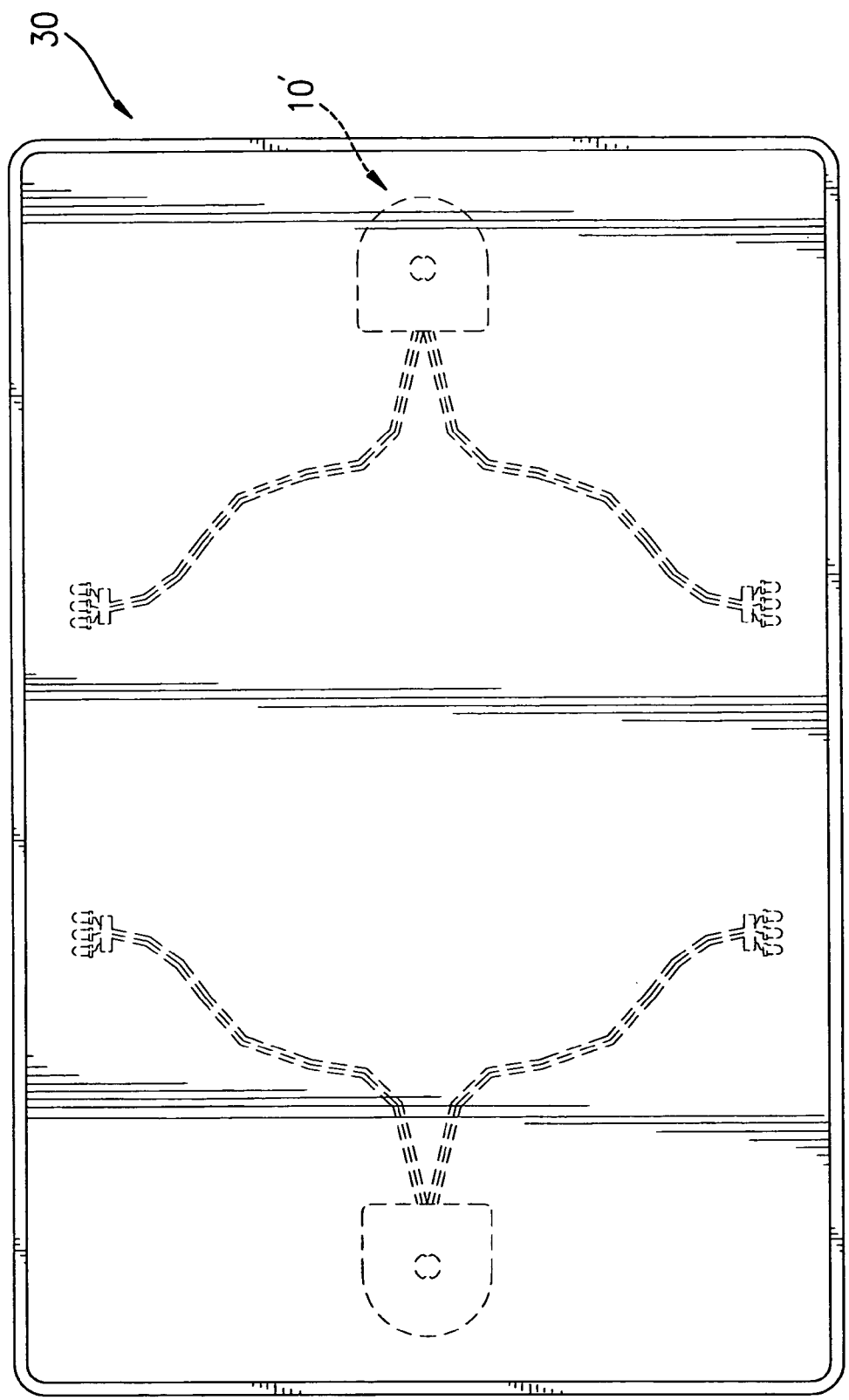
FIG. 4 is a top plan view of a floor mat with two generators in accordance with the present invention.

With reference to FIG. 1, a generator (10) in accordance with the present invention comprises a base (11), a stator (13), a rotor base (15), a rotor (14), a drive shaft (16), a biasing member (18) and a top cover (12). With further reference to FIGS. 2 and 4, the base (11) is mounted securely in an object, such as a shoe or a floor mat.

The stator (13) is annular and is mounted on the base (11). An illumination or audio device is mounted in the object in which the generator (10) is mounted and is connected electrically to the generator in a conventional manner.

The rotor base (15) is rotatably mounted on the base (11) and in the stator (13). The rotor base (15) has a central hole (152) with an inner surface defined through the rotor base (15) and at least one key (154) formed on the inner surface of the central hole (152).

The rotor (14) is mounted around the rotor base (15) and has a gap (not numbered) defined between the rotor (14) and the stator (13).

The drive shaft (16) is slidably mounted in the central hole (152) in the rotor base (15) and has a top (not numbered), a bottom (not numbered), an outer surface (not numbered) and at least one spiral groove (164). The at least one spiral groove (164) is defined in the outer surface and extends from the bottom of the drive shaft (16). The at least one key (154) on the rotor base (15) is slidably mounted in the at least one spiral groove (164).

The biasing member (18) is mounted between the base (11) and the drive shaft (16) to provide a restitution force to the drive shaft (16) when the drive shaft (16) is pushed down. With further reference to FIG. 2, the biasing member (18) in an optional embodiment is a spring and may be any resilient material. The base (11) optionally has an axial rod (112) extending upward from the base (11). The biasing member (18) is mounted around the axial rod (112) and has two ends abutting respectively the base (11) and the bottom of the drive shaft (16). The drive shaft (16) has a hole (not numbered) defined in the bottom to receive the axial rod (112) when the drive shaft (16) is pressed downward.

The top cover (12) is mounted on the base (11) to cover the stator (13), the rotor base (15), the rotor (14), the drive shaft (16) and the biasing member (18). The top cover (12) has a central bore (122) through which the top of the drive shaft (16) non-rotatably extends. In an optional embodiment, the central bore (122) has an inner surface and at least one keyway (124), and the drive shaft (16) has a corresponding number of ribs (162). The at least one keyway (124) is defined in the inner surface of the central bore (122). The at least one rib (162) is formed on the outer surface of the drive shaft (16) and is slidably mounted respectively in the at least one keyway (124) in the central bore (122) of the top cover (12). The engagement of the keyways (124) and the ribs (162) keeps the drive shaft (16) from rotating relative to the top cover (12). In an alternative embodiment, the central bore (122) in the top cover (12) is non-circular, and the top of the drive shaft (16) is a corresponding non-circular cylinder. The non-circular engagement between the central bore (122) and the drive shaft (16) keeps the drive shaft (16) from rotating relative to the top cover (12) but allows the drive shaft (16) to slide in and out of the central bore (122).

Figure 3:
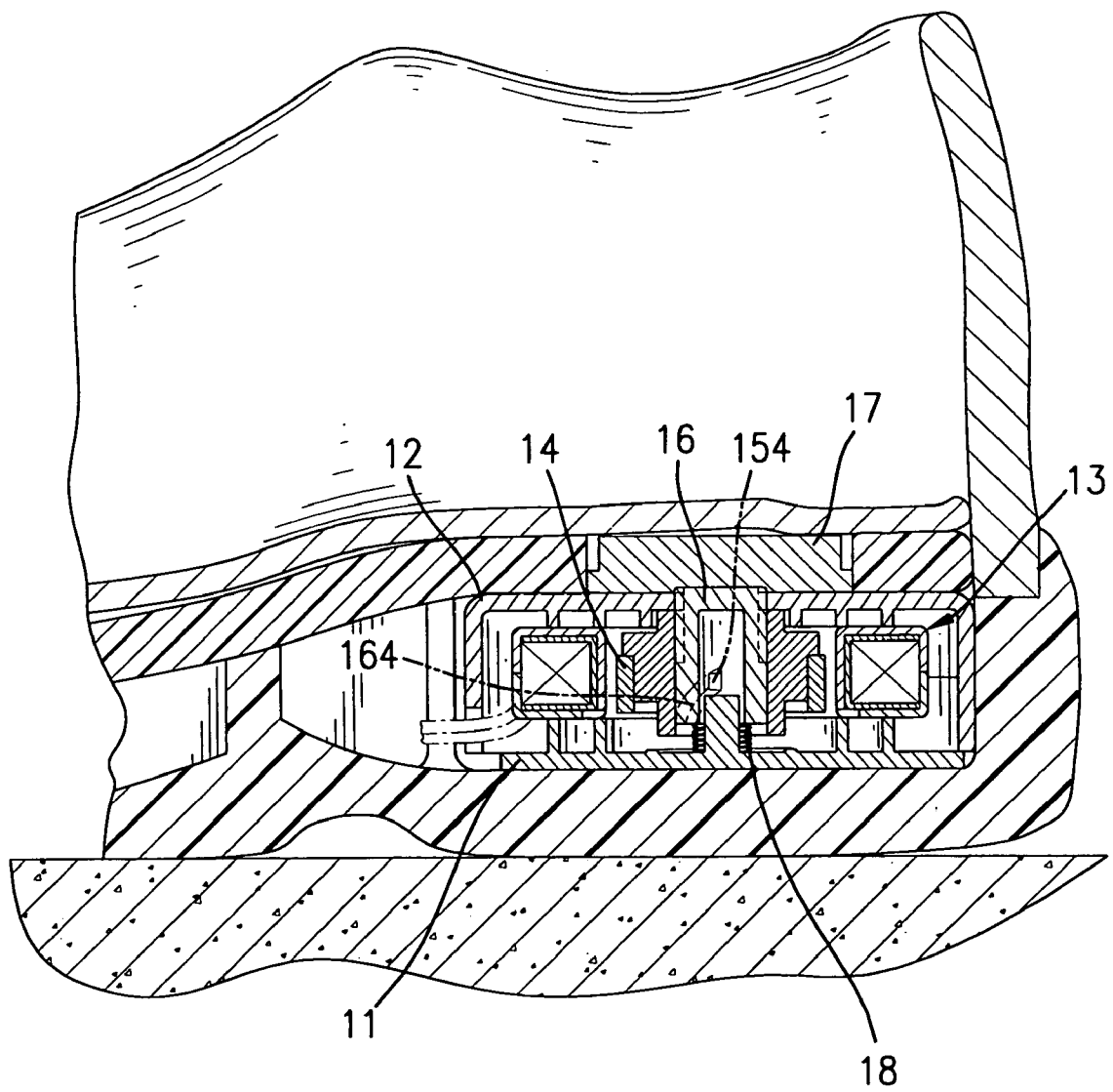
FIG. 3 is an operational cross sectional side plan view of the shoe in FIG. 2 with the drive shaft of the generator in FIG. 1 pressed down.

With reference to FIGS. 1 to 3, the generator (10) can be mounted in a sole of a shoe. In this application, a button (17) is mounted on the top of the drive shaft (16) and partially extends into the shoe. When a person wearing the shoe with the generator (10) steps on the ground, the person's foot will press and move the button (17) and the drive shaft (16) downward. Because the drive shaft (16) non-rotatably extends through the top cover (12), the rotor base (15) with the rotor (14) will be rotated due to the engagement between the at least one key (154) and the at least one groove (164) when the drive shaft (16) moves downward. Accordingly, electrical current will be generated in the coil in stator (13) when the rotor (14) with the permanent magnet rotates relative to the stator (13) and will operate the illumination device or the audio device connected to the coil.

When the person's heel lifts off the ground, the force pressing the button (17) will be released, and the restitution force in the biasing member (18) will push the drive shaft (16) upward. The upward movement of the drive shaft (16) and the engagement between the key (154) on the rotor base (15) and the groove (164) in the drive shaft (16) causes the rotor (14) to rotate in the reverse direction and generate electrical current. The illumination device or the audio device can operate with the electricity provided by the generator (10) to provide a decorative effect and an audible warning while a person is walking.

Figure 5:
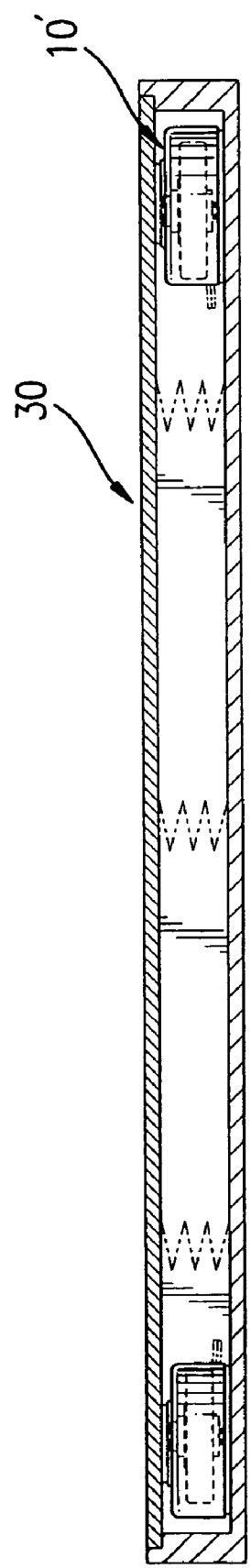
FIG. 5 is a side plan view in partial section of the floor mat in FIG. 4.

With reference to FIGS. 4 and 5, another application of the generator (10') in accordance with the present invention mounts the generator (10') in a floor mat (30). The floor mat (30) comprises a base (not numbered), multiple springs (not numbered) and a top (not numbered). The springs are mounted in the base and support the top that is moveably mounted on the base. Two or more generators (10') are mounted in the base of the floor mat (30) and are electrically connected respectively to illumination devices (not numbered). The top of the drive shaft of each generator (10') abuts the top of the floor mat (30). When someone steps onto the floor mat (30), the drive shaft will be pressed by the top of the floor mat (30), which will generate electricity to light the illumination devices.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A generator comprising:
   a) a base;
   b) an annular stator mounted on the base;
   c) a rotor base rotatably located in the stator and having:
      i) a central hole; and
      ii) at least one key formed on an interior surface of the central hole;
   d) a rotor mounted in the rotor base and spaced apart from the annular stator a predetermined distance;
   e) a drive shaft slidably inserted into the central hole of the rotor base and movable between first and second positions, in the first position the drive shaft is located in an upwardly most position, in the second position the drive shaft is located in a downwardly most position, the drive shaft having at least one spiral groove located on an outer surface and extending upwardly from a bottom thereof, one of the at least one key is slidably inserted into each of the at least one spiral groove;
   f) a biasing member located between the base and the drive shaft and providing a restitution force pressing the drive shaft away from the base; and
   g) a top cover mounted to the base and covering the stator, the rotor base, the drive shaft, and the biasing member, and having a central bore hole, a top of the drive shaft extending through the central bore,
   wherein the rotor is rotated in a first direction when the shaft moves from the first position toward the second position, and the rotor is rotated in a second direction opposite the first direction when the shaft moves from the second position toward the first position.

2. The generator according to claim 1, wherein the base having an axle rod extending upwardly from a center thereof, the axle rod being inserted through the biasing member, the drive shaft having a drive shaft hole, the axle rod is slidably inserted into the drive shaft hole when the drive shaft is pressed downwardly toward the second position.

3. The generator according to claim 1, wherein the top cover having at least one keyway located on an interior surface of the central bore hole, the drive shaft having at least one rib, one of the at least one rib is slidably inserted into each of the at least one keyway preventing the drive shaft from rotating.

* * * * *